United States Patent
Fuke

(10) Patent No.: US 9,453,556 B2
(45) Date of Patent: Sep. 27, 2016

(54) ROPE CONNECTING SUPPORT FOR USE IN CRANE VEHICLE WHEN HOIST ROPE IS STRETCHED

(71) Applicant: TADANO LTD., Takamatsu-shi, Kagawa (JP)

(72) Inventor: Hidetoshi Fuke, Ayautagun (JP)

(73) Assignee: TADANO LTD., Takamatsu-shi (JP)

( * ) Notice: Subject to any disclaimer, the term of this patent is extended or adjusted under 35 U.S.C. 154(b) by 0 days.

(21) Appl. No.: 14/727,018

(22) Filed: Jun. 1, 2015

(65) Prior Publication Data
US 2015/0345589 A1 Dec. 3, 2015

(30) Foreign Application Priority Data
Jun. 2, 2014 (JP) ................................. 2014-113774

(51) Int. Cl.
*F16G 11/10* (2006.01)
*B66C 23/26* (2006.01)
*B66C 23/42* (2006.01)

(52) U.S. Cl.
CPC ............... *F16G 11/10* (2013.01); *B66C 23/26* (2013.01); *B66C 23/42* (2013.01); *Y10T 24/3991* (2015.01)

(58) Field of Classification Search
CPC .... F16G 11/10; F16G 11/108; F16G 11/105; F16G 11/00; F16B 2/00; F16B 7/00; B66D 5/02
USPC ............ 24/115 K, 135 K, 136 R, 116 A, 128
See application file for complete search history.

(56) References Cited

U.S. PATENT DOCUMENTS

| 722,949 | A | * | 3/1903 | Crowe | F16G 11/10 24/133 |
| 1,072,556 | A | * | 9/1913 | Wood | F16G 11/10 114/218 |
| 2,628,855 | A | * | 2/1953 | Cushman | F16G 11/10 24/645 |
| 4,602,891 | A | * | 7/1986 | McBride | B66C 1/12 24/136 K |
| 4,678,360 | A | * | 7/1987 | Miller | F16G 11/00 24/128 |
| 5,927,895 | A | * | 7/1999 | Watanabe | F16B 45/02 24/669 |

(Continued)

FOREIGN PATENT DOCUMENTS

| JP | 2012-232805 A | 11/2012 |
| JP | 2013-159486 A | 8/2013 |
| JP | 2014-031231 A | 2/2014 |

OTHER PUBLICATIONS

Oct. 12, 2015 Extended Search Report issued in European Patent Application No. 15169909.7.

Primary Examiner — Robert J Sandy
Assistant Examiner — Rowland Do
(74) Attorney, Agent, or Firm — Oliff PLC

(57) ABSTRACT

A rope connecting support includes: a base having a predetermined dimension; a hoist rope locking part that removably locks a rod part provided on the front end of the hoist rope onto an upper surface of the base in one end side of the base; and an auxiliary rope connecting part that connects one end of an auxiliary rope to the upper surface of the base in the other side of the base, wherein the base includes an uphill part formed by upwardly inclining an lower surface of the one end side of the base, and the auxiliary rope connecting part includes an upright plate used to pin the one end of the auxiliary rope. By this means, the rod part is positioned on right and left sides thereof by the hoist rope locking part, and also positioned with respect to a longitudinal direction of the rod part.

6 Claims, 19 Drawing Sheets

(56) References Cited

U.S. PATENT DOCUMENTS 6,415,480 B1 * 7/2002 Kane .................. F16G 11/10
            24/134 R
7,219,951 B2 * 5/2007 Rasmussen ............. B60P 7/08
            296/156

* cited by examiner

ROPE CONNECTING SUPPORT FOR USE IN CRANE VEHICLE WHEN HOIST ROPE IS STRETCHED

CROSS-REFERENCES TO RELATED APPLICATIONS

This application claims the benefit of Japanese Patent Application No. 2014-113774, filed Jun. 2, 2014, which is incorporated herein by reference.

BACKGROUND

1. Technical Field

The present invention relates to a rope connecting support for use in a crane vehicle when a hoist rope wounded around a winch on a swivel base is stretched along the upper surface of a boom.

2. Related Art

When a large crane vehicle moves on a public road, its boom and winch (sub-winch) sometimes are removed and delivered separately due to a weight limit or height limit. In this case, a hoist rope to be stretched along the upper surface of the boom is wound around the winch. Then, in order to make the crane operational at a workplace, it is necessary to draw the front end side of the hoist rope wounded around the winch to the front end of the boom along the upper surface of the boom.

As shown in FIG. 16, conventionally, in order to draw the front end side of the hoist rope wound around the winch to the front end of the boom along the upper surface of the boom, an operator M1 holds a front end 6b of a hoist rope 6 on a swivel base 2 and walks on a boom 3 to a front end 3b (the position of the operator M2) of the boom 3, reeling out the hoist rope 6 from a winch 5, so that it is possible to bring the front end (6b') of the hoist rope (6') to the front end 3b of the boom 3. Then, the front end (6b") of the hoist rope (6") is suspended downward via a sheave 33 provided on the front end 3b of the boom 3, so that the hoist rope can be stretched on the upper surface 3c of the boom 3.

However, when the crane vehicle is large, it is dangerous for the operator M1 (M2) to walk on the upper surface 3c of the boom 3, holding the front end 6b' of the hoist rope 6'. This is because the upper surface 3c of the boom 3 is located in a considerably high position, for example, about 4 m from the ground even if the boom 3 lies (in a horizontal position); and the width of the boom 3 is not very wide (for example, about 60 to 70 cm).

Moreover, conventionally, in order to guard the operator from danger of stretching the hoist rope in a high place, a plurality of stanchions S are mounted to the boom 3 to stretch a safety rope T between the stanchions S as shown in FIG. 16. In this case, it is troublesome and dangerous for the operator to set up the stanchions S and the safety rope T in a high place. Moreover, the stanchions S and the safety rope T still cannot eliminate the danger from the operator to walk on the upper surface 3c of the boom 3, holding the front end 6b of the hoist rope 6 to stretch the hoist rope 6 in a high place.

Incidentally, the applicant filed a method of extending hoisting freight rope in boom detachable crane vehicle (see Patent Literature 1). In this method, the front end side of the hoist rope wound around the winch is drawn to the front end of the boom, along the upper surface of the boom. Here, this method disclosed in Patent Literature 1 is applicable to a crane vehicle having the boom 3 which is separated from the vehicle 1 (swivel base 2) and conveyed by a truck, and then, the boom (3') is mounted to the swivel base 2 at a workplace, as shown in FIG. 17.

The method disclosed in Patent Literature 1 includes the following steps. First, as shown in FIG. 17, an auxiliary rope 7 having a length from a base end 3a to a front end 3b of the boom 3 (from 7a to 7b) is mounted to the boom 3 separated from the vehicle 1 (swivel base 2), along the upper surface 3c of the boom 3. Here, this auxiliary rope 7 is used to pull the hoist rope 6 being reeled out of the winch 5 and is made of thin string (may be a nylon rope).

Next, as shown in FIG. 17, while the boom 3' with the auxiliary rope 7' is mounted on the swivel base 2, the operator M1 rides on the swivel base 2 and connects the front end 6b of the hoist rope 6 reeled out of the winch 5 to a base end 7a' of the auxiliary rope 7' for pulling the hoist rope 6 (the connecting portion is shown as "R" in FIG. 18). After that, as shown in FIG. 18, the operator M3 on the ground draws the front end 7c side of the auxiliary rope 7 downward via the sheave 33 provided on the front end 3b of the boom 3, so that the hoist rope 6 reeled out of the winch 5 can be stretched to the front end 3b of the boom 3, along the upper surface 3c of the boom 3. Here, since the area on the swivel base 2 is relatively wide, it is safe for the operator M1 (shown in FIG. 17) to work on the swivel base 2.

As described above, Patent Literature 1 (FIGS. 17 and 18) provides an advantage of eliminating the dangerous work in a high place because the operator has not walk on the upper surface 3c of the boom 3 (in the high place) to stretch the hoist rope 6.

The connection (connecting part R) between the front end 6b of the hoist rope 6 and the base end 7a of the auxiliary rope 7 is made by using an appropriate connector, or by directly connecting the front end 6b and the base end 7a to one another. Here, the connecting part R is considerably large in diameter.

Meanwhile, a plurality of guard members 36 (the number of them is two in FIGS. 17 and 18) are provided on the upper surface 3c of the boom 3 of the crane vehicle, at intervals in the longitudinal direction of the boom 3. As shown in FIG. 19, each of the guard members 36 is formed by right and left upright rods 37, and a connecting rod 38 that connects between the upright rods 37 on the upper surface 3c of the boom 3. This connecting rod 38 is disposed in the width direction of the boom 3, and therefore may become an obstacle to the ropes (including the connecting part R) being moved on the upper surface 3c of the boom 3c.

Patent literature 1: Japanese Patent Application Laid-Open No. 2012-232805

According to the method disclosed in Patent Literature 1 (FIGS. 17 and 18), the front end 6b of the hoist rope 6 is connected to the base end 7a of the auxiliary rope 7 provided along the upper surface 3c of the boom 3 on the swivel base 2, and then the front end 7c side of the auxiliary rope 7 is drawn down from the ground beneath the front end 3b of the boom 3 as shown in FIG. 18. By this means, it is possible to stretch the hoist rope 6 reeled out of the winch 5 along the upper surface 3c of the boom 3. As a result, the dangerous work in a high place is not needed to stretch the hoist rope 6 on the boom 3. However, when the front end 7c side of the auxiliary rope 7 is drawn down in the state shown in FIG. 18, the connecting part R between the front end 6b of the hoist rope 6 and the base end 7a of the auxiliary rope 7 catches on the obstacle (the connecting rod 38 of the guard member 36 shown in FIG. 19) provided on the upper surface 3c of the boom 3, and therefore may not smoothly get over the obstacle (connecting rod 38). In other words, the connecting part R between the front end 6b of the hoist rope 6 and the base end 7a of the auxiliary rope 7a is considerably large in diameter, and therefore this makes a problem that the connecting part R catches on the obstacle (connecting rod 38) when being moved on the upper surface 3c of the boom 3.

SUMMARY

It is therefore an object of the present invention to provide a rope connecting support for use in a crane vehicle when a hoist rope is stretched, in a method of stretching a hoist rope including the steps of: connecting one end of the hoist rope to one end of the auxiliary rope; and drawing the front end of the auxiliary rope downward from a position beneath the front end of the boom, so that it is possible to bring the front end of the hoist rope to the front end of the boom to stretch the hoist rope along the upper surface of the boom, wherein when the connecting part between the front end of the hoist rope and the base end of the auxiliary rope is moved on the upper surface of the boom, the connecting part can smoothly get over the obstacles (the connecting rods of the guard members) provided on the upper surface of the boom; and the front end of the hoist rope can be firmly connected to one end (base end) of the auxiliary rope.

The present invention has the following aspects to solve the above-described problems. Hereinafter, the title of the invention "Rope connecting support for use in crane vehicle when hoist rope is stretched" may be simply referred to as "Rope connecting support."

<Aspect 1 (Corresponding to Claim 1)>

According to a first aspect of the invention, the rope connecting support is used to draw the front end side of the hoist rope to the front end of the boom along the upper surface of the boom by connecting the front end of the hoist rope wound around the winch on the swivel base of the crane vehicle to one end of the auxiliary rope for pulling the hoist rope; and drawing the other end side of the auxiliary rope downward via the front end of the boom. Hereinafter, one end of the auxiliary rope which is connected to the front end of the hoist rope may be referred to as "base end" of the auxiliary rope, while the other end of the auxiliary rope may be referred to as "front end" of the auxiliary rope.

The rope connecting support includes: a base having a predetermined dimension; a hoist rope locking part configured to be able to removably lock a rod part provided on the front end of the hoist rope onto the upper surface of the base in one end side of the base; and an auxiliary rope connecting part configured to be able to connect the base end of the auxiliary rope to the upper surface of the base in the other end side of the base. Here, the rod part provided on the front end of the hoist rope has an outer diameter slightly greater than the rope part (wire part) of the hoist rope, and can be removably locked onto the hoist rope locking part. Meanwhile, it is preferred that the base and of the auxiliary rope is formed, for example, in a ring shape and a pin may be inserted into the hole of the ring.

Moreover, this rope connecting support includes an uphill part formed by upwardly inclining the lower surface of one end side of the base in which the auxiliary rope connecting part is provided. This rope connecting support is moved to the front end of the boom on the upper surface of the boom while the respective ends of the hoist rope and the auxiliary rope are connected to one another. Here, the uphill part becomes the head of the rope connecting support when being moved to the front end of the boom.

The auxiliary rope connecting part includes an upright plate to pin the base end of the auxiliary rope. In a state in which the base end of the auxiliary rope is pinned to the upright plate and the rod part provided on the front end of the hoist rope is locked onto the hoist rope locking part, the rod part is positioned on the right and left sides thereof by the hoist rope locking part, and is also positioned with respect to the longitudinal direction of the rod part by the hoist rope locking part and the base end of the auxiliary rope that is pinned.

The rope connecting support recited in claim 1 is used in a state in which the boom that lies in an approximately horizontal position without the hoist rope (because the hoist rope is still wound around the winch) is mounted on the swivel base.

By using this rope connecting support, the operator who rides on the swivel base connects the front end of the hoist rope reeled out of the winch to the base end of the auxiliary rope. Here, the base end of the auxiliary rope may be drawn from the front end side of the boom to the base end of the boom along the upper surface of the boom in advance. Alternatively, the front end side of the auxiliary rope may be drawn to the front end of the boom along the upper surface of the boom, after the base end of the auxiliary rope is connected to the rope connecting support on the swivel base. The auxiliary rope may be a thin string which is light and soft, and therefore can be easily handled by an operator. In addition, in order to stretch the auxiliary rope over the entire length from the front end to the base end of the boom on the upper surface of the boom, the operator can reach the upper surface of the boom by, for example, riding on a stepladder from the ground, or riding on the vehicle body or the swivel base of the crane vehicle. As a result, the operator does not need to ride on the boom, and therefore safely stretch the auxiliary rope over the entire length of the upper surface of the boom.

The front end (rod part) of the hoist rope reeled out of the winch is locked onto the hoist rope locking part of the rope connecting support while the base end of the auxiliary rope is connected to the auxiliary rope connecting part of the rope connecting support on the swivel base. In this state in which the rope connecting support connects the front end of the hoist rope and the base end of the auxiliary rope to one another, the rod part provided on the front end of the host rope is positioned precisely by the hoist rope locking part and the base end of the auxiliary rope held by the upright plate of the auxiliary rope connecting part.

In a state in which the rope connecting support connects the respective ends of the hoist rope and the auxiliary rope to one another; the auxiliary rope is drawn to the front end of the boom along the upper surface of the boom; and the front end side of the auxiliary rope is suspended downward via the sheave provided on the front end of the boom, when the operator draws the front end side of the auxiliary rope down, reeling the hoist rope out of the winch, the rope connecting support connecting between the ropes and having the bottom surface that faces the upper surface of the boom is moved to the front end of the boom on the upper surface of the boom. At this time, one end side of the rope connecting support in which the uphill part is formed is directed to the traveling direction. When the rope connecting support reaches an obstacle (the connecting rod of the guard member) provided on the upper surface of the boom, the uphill part easily runs over the obstacle, and therefore the rope connecting support can easily get over the obstacle.

Then, at the time the rope connecting support reaches the front end of the boom, the auxiliary rope is stopped from being drawn down; the operator rides on the stepladder and disconnects the front end (rod part) of the hoist rope from the hoist rope locking part; and the disconnected front end of the hoist rope is drawn down via the sheave. As a result, it is possible to stretch the hoist rope to the front end of the boom along the upper surface of the boom.

<Aspect 2 (Corresponding to Claim 2)>

According to the second aspect of the present invention, the auxiliary rope connecting part includes two, parallel right and left upright plates that can sandwich and fix one end of the auxiliary rope therebetween by a pin. When the rod part is locked onto the hoist rope locking part, the front end of the rod part is positioned between the upright plates.

<Aspect 3 (Corresponding to Claim 3)>

According to the third aspect of the present invention, the hoist rope locking part includes: a standing part configured to prevent the rear end of the rod part from getting out backward; and a bend part that bends to the front end of the base in order to prevent the rear end of the rod part from getting out upward.

<Aspect 4 (Corresponding to Claim 4)>

According to fourth aspect of the present invention, the base is a rectangular flat plate whose bottom surface has a predetermined dimension.

<Aspect 5 (Corresponding to Claim 5)>

According to fifth aspect of the present invention, the upright plate of the auxiliary rope connecting part includes a stopper configured to prevent the front end of the rod part from being lifted up while the rod part is locked onto the hoist rope locking part, wherein the stopper is provided switchably between a position in which the rod part is closed upwardly and a position in which the rod part is open upwardly.

<Aspect 6 (Corresponding to Claim 6)>

According to the sixth aspect of the present invention, a locking part is provided on the base to removably lock the rope connecting support onto the winch box or onto a position in the vicinity of the winch. The locking part may be a hole into which a bolt is inserted.

<Effect of the Invention Recited in Claim 1>

The rope connecting support recited in claim 1 produces the following effects.

1) The base includes the uphill part formed by upwardly inclining the lower surface of one end side of the base in which the auxiliary rope connecting part is provided. Therefore, when the rope connecting support is moved to the front end side of the boom on the upper surface of the boom while the boom connecting support connects the respective ends of the hoist rope and the auxiliary rope to one another, the uphill part allows the rope connecting support to easily get over the obstacle provided on the upper surface of the boom. As a result, it is possible to smoothly draw the hoist rope.

2) In the state in which the base end of the auxiliary rope is pinned to the auxiliary rope connecting part while the rod part provided on the front end of the hoist rope is locked onto the hoist rope locking part, the rear end of the rod part is positioned on the right and left sides thereof by the hoist rope locking part and is also positioned with respect to the longitudinal direction of the rod part. Therefore, it is possible to stably hold the front end of the hoist rope in position with respect to the rope connecting support (to prevent the front end of the hoist rope from being removed accidentally from the rope connecting support).

<Effect of the Invention Recited in Claim 2>

The auxiliary rope connecting part includes two, parallel right and left upright plates. When the rod part is locked onto the hoist rope locking part, the front end of the rod part is positioned between the right and left upright plates.

Therefore, when the rod part is locked onto the hoist rope locking part, front end of the rod part is positioned between the upright plates. As a result, it is possible to hold the both ends of the rod part in the longitudinal direction, and therefore to more stably hold the rod part in position. In addition, it is possible to effectively use the auxiliary rope connecting part for positioning the front end (rod part) of the hoist rope.

<Effect of the Invention Recited in Claim 3>

The hoist rope locking part includes: a standing part configured to prevent the rear end of the rod part from getting out backward; and a bend part that bends to the front end of the base in order to prevent the rear end of the rod part from getting out upward.

Therefore, it is possible to stably hold the rod part in position while the rod part is locked onto the hoist rope locking part.

<Effect of the Invention Recited in Claim 4>

The base is a rectangular flat plate whose bottom surface has a predetermined dimension. Therefore, it is possible to provide a wide contact area between the lower surface of the base and the upper surface of the boom when the rope connecting support is moved on the upper surface of the boom.

As a result, it is possible to stably move the rope connecting support without swaying.

<Effect of the Invention Recited in Claim 5>

The upright plate of the auxiliary rope connecting part includes a stopper configured to prevent the front end of the rod part from being lifted up while the rod part is locked onto the hoist rope locking part, wherein the stopper is provided switchably between a position in which the rod part is closed upwardly and a position in which the rod part is open upwardly.

By this means, it is possible to prevent the front end of the rod part from being lifted up accidentally, and therefore to more stably hold the rod part in position.

<Effect of the Invention Recited in Claim 6>

A locking part is provided on the base to removably lock the rope connecting support onto the winch box or a position in the vicinity of the winch.

Therefore, it is possible to store the front end of the hoist rope together with the rope connecting support while the front end (rod part) of the hoist rope is held by the rope connecting support. Therefore, it is possible to effectively use the rope connecting support as an assistant tool for storing the front end of the hoist rope.

DESCRIPTION OF EXEMPLARY EMBODIMENTS

Figure 3:
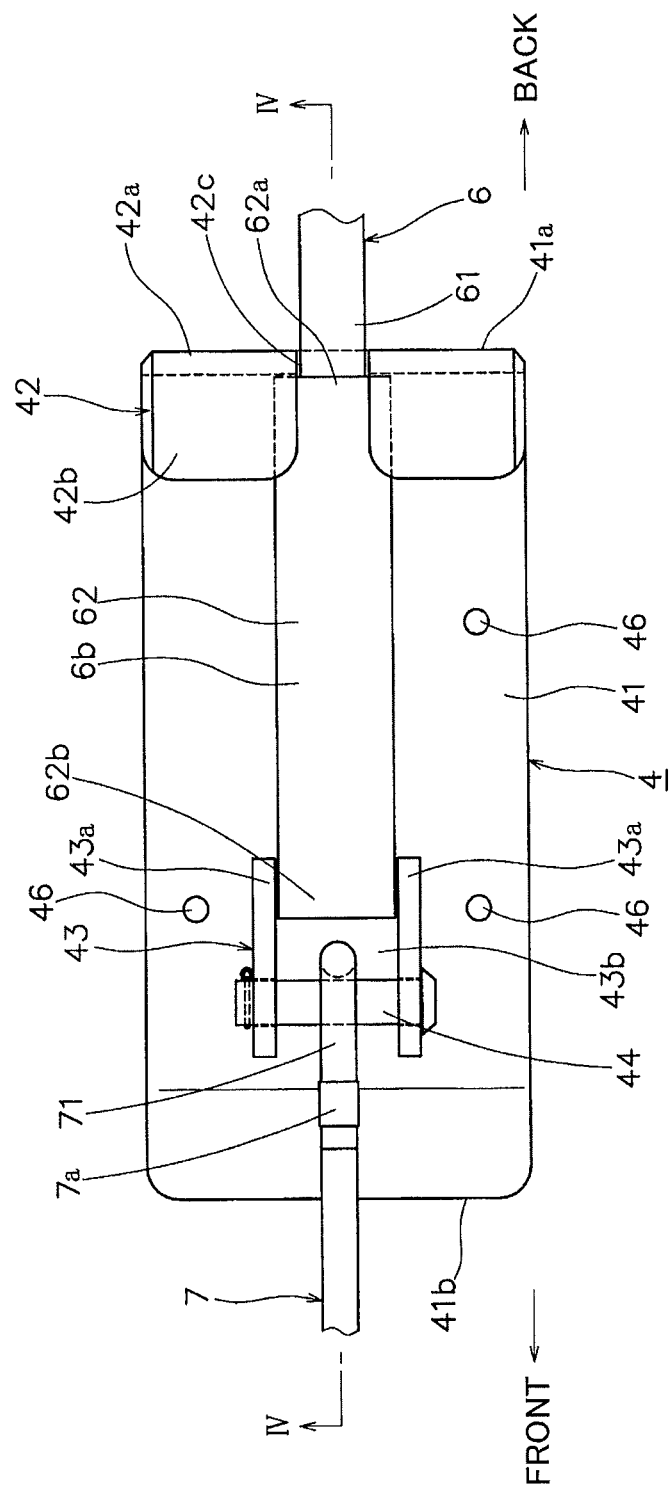
FIG. 3 is a plan view of FIG. 2.
Figure 4:
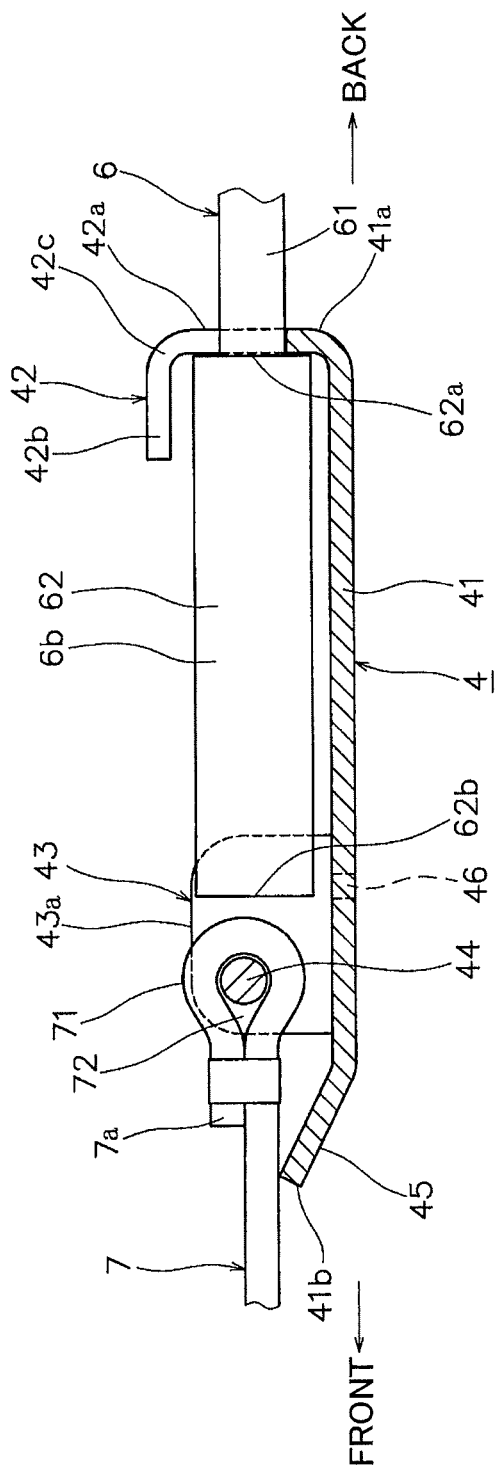
FIG. 4 is a cross-sectional view of FIG. 3 taken along line IV-IV.
Figure 5:
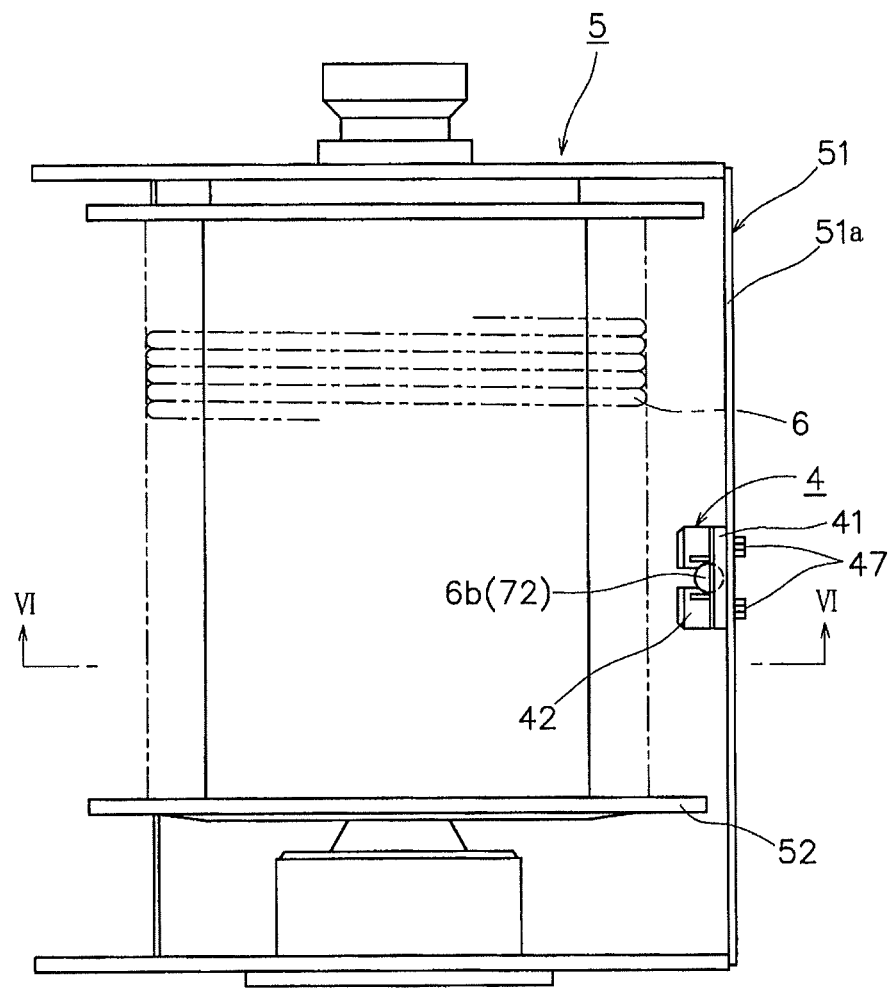
FIG. 5 is a plan view showing a state in which the rope connecting support shown in FIG. 1 together with the front end of the hoist rope is stored in a winch box.
Figure 6:
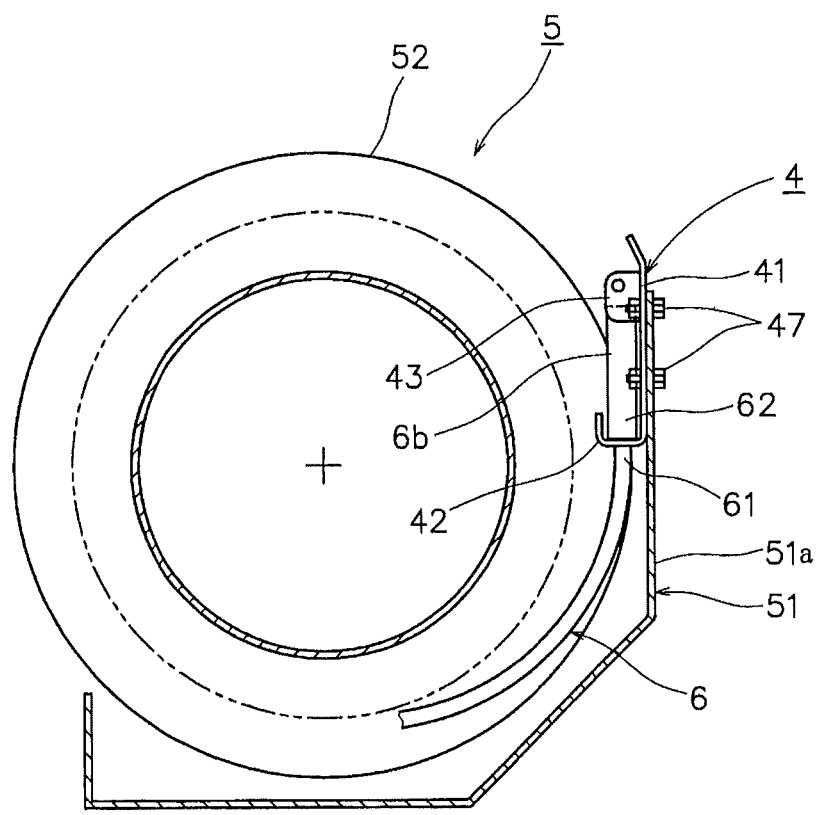
FIG. 6 is a cross-sectional view of FIG. 5 taken along line VI-VI.
Figure 12:
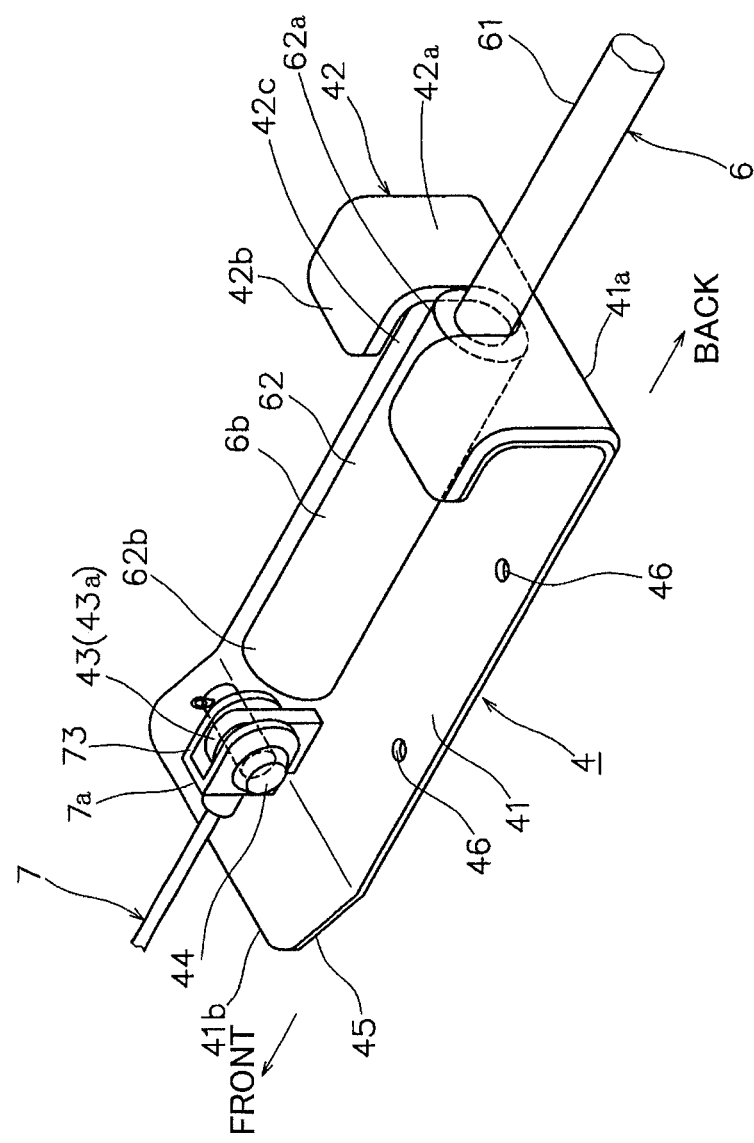
FIG. 12 is a perspective view showing a state in which the rope connecting support and its associated components are coupled to each other according to Embodiment 2 of the present invention.
Figure 13:
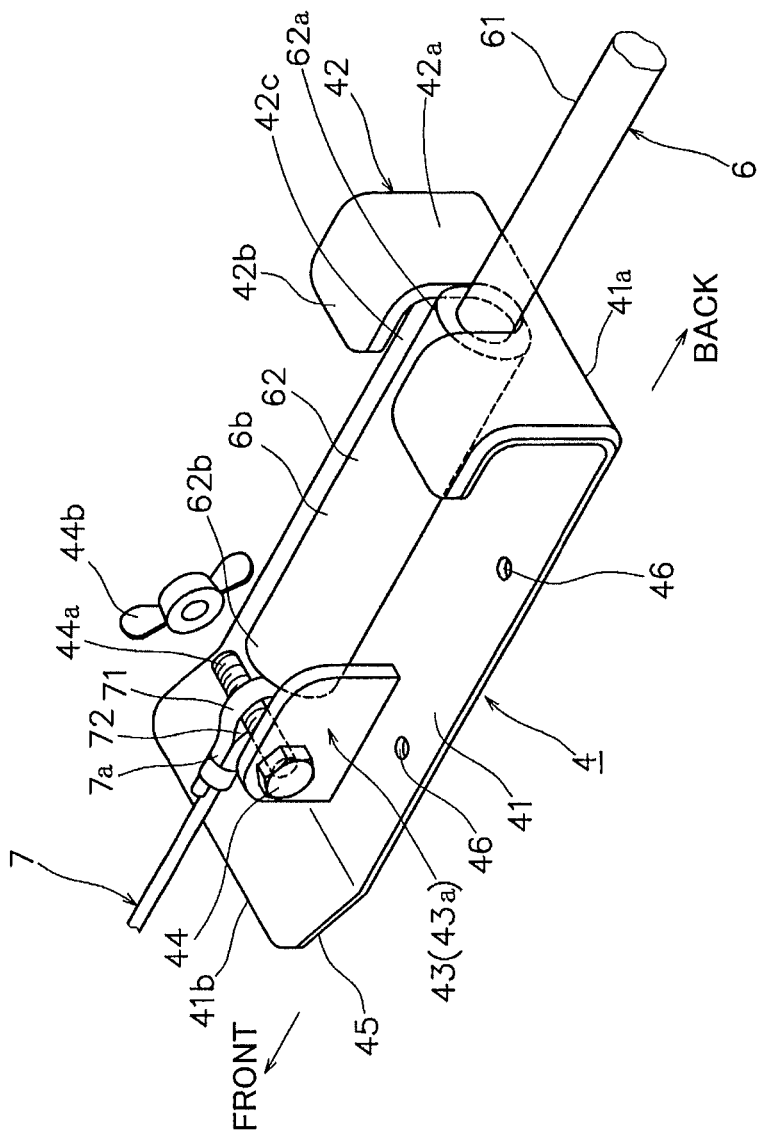
FIG. 13 is a perspective view showing a state in which the rope connecting support and its associated components are coupled to each other according to Embodiment 3 of the present invention.
Figure 14:
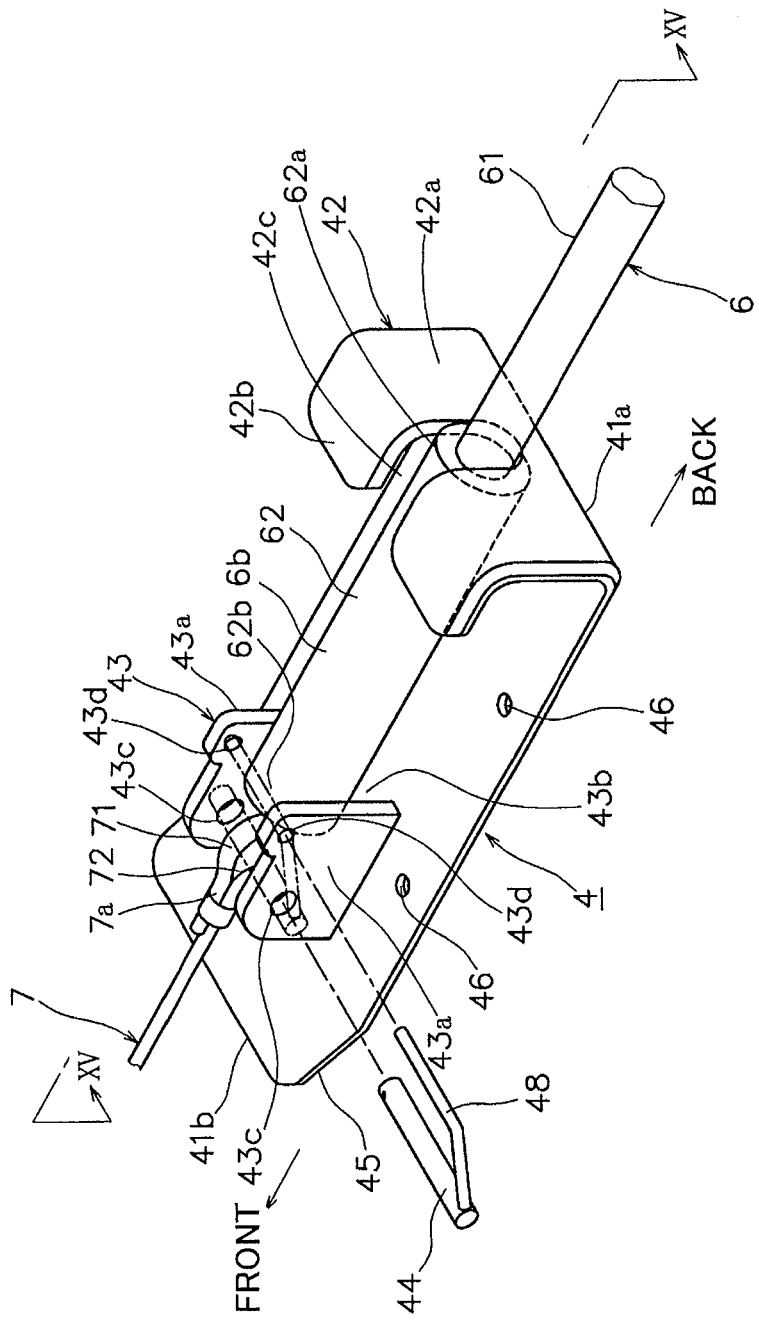
FIG. 14 is a perspective view showing a state in which the rope connecting support and its associated components are coupled to each other according to Embodiment 4 of the present invention.
Figure 15:
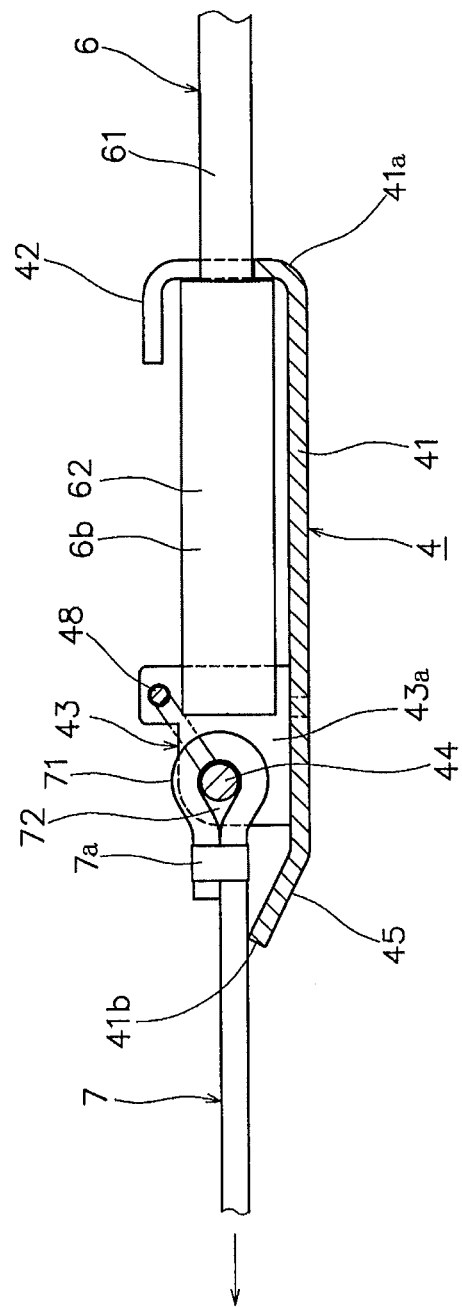
FIG. 15 is a vertical cross-sectional view of FIG. 14 taken along the longitudinal center line of the rope connecting support.
Figure 16:
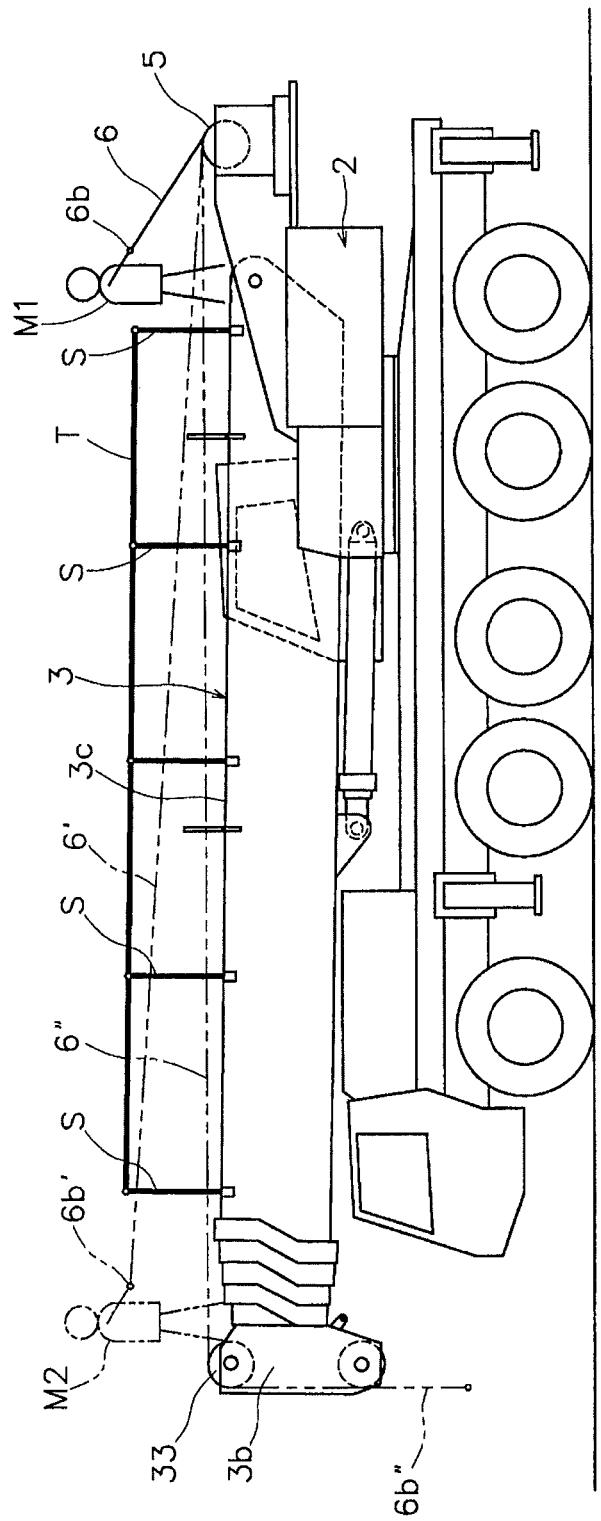
FIG. 16 is a drawing explaining a conventional method of stretching a hoist rope in a crane vehicle.
Figure 17:
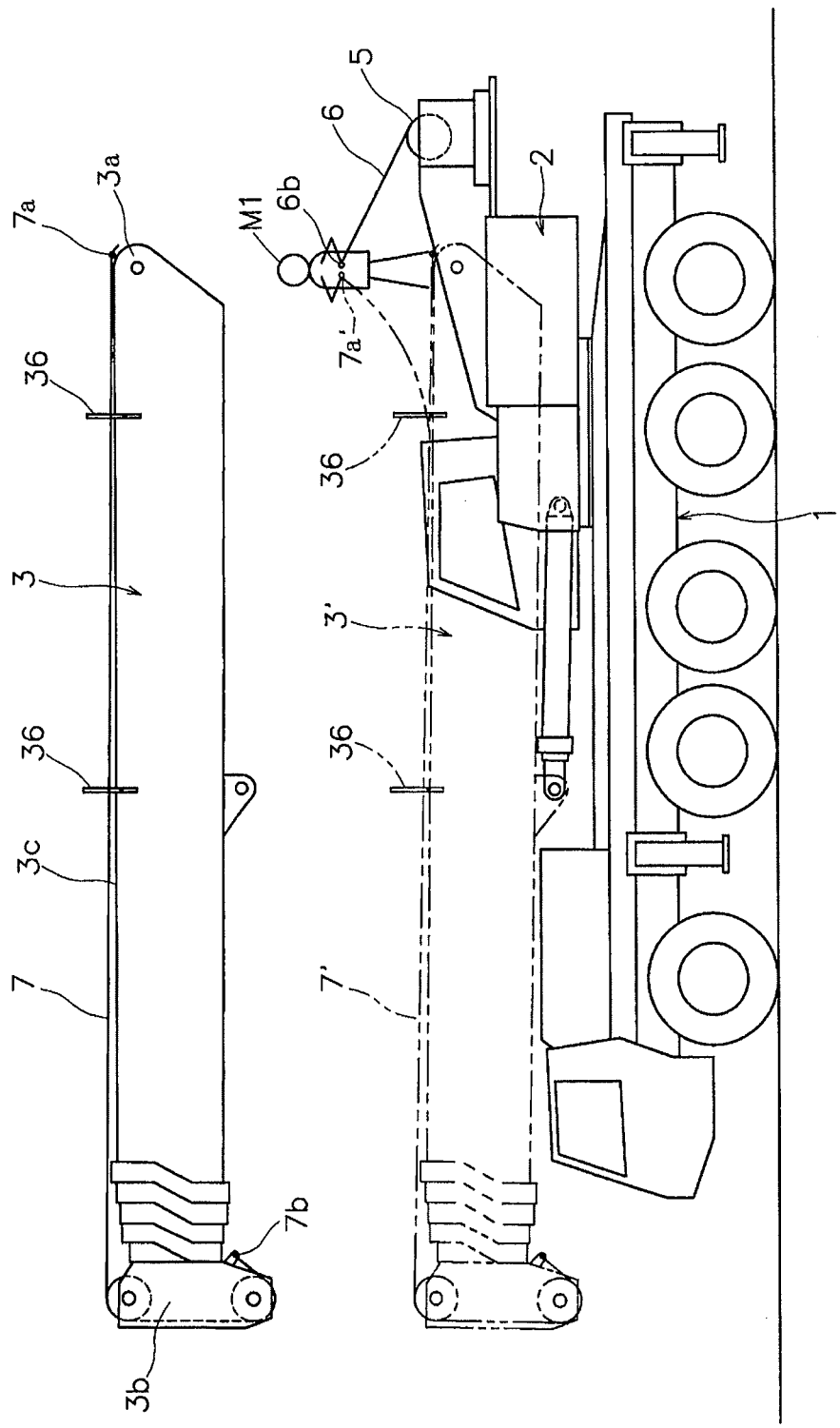
FIG. 17 is a drawing explaining the initial step of the conventional method of stretching a hoist rope in a crane vehicle, disclosed in Patent Literature 1.
Figure 18:
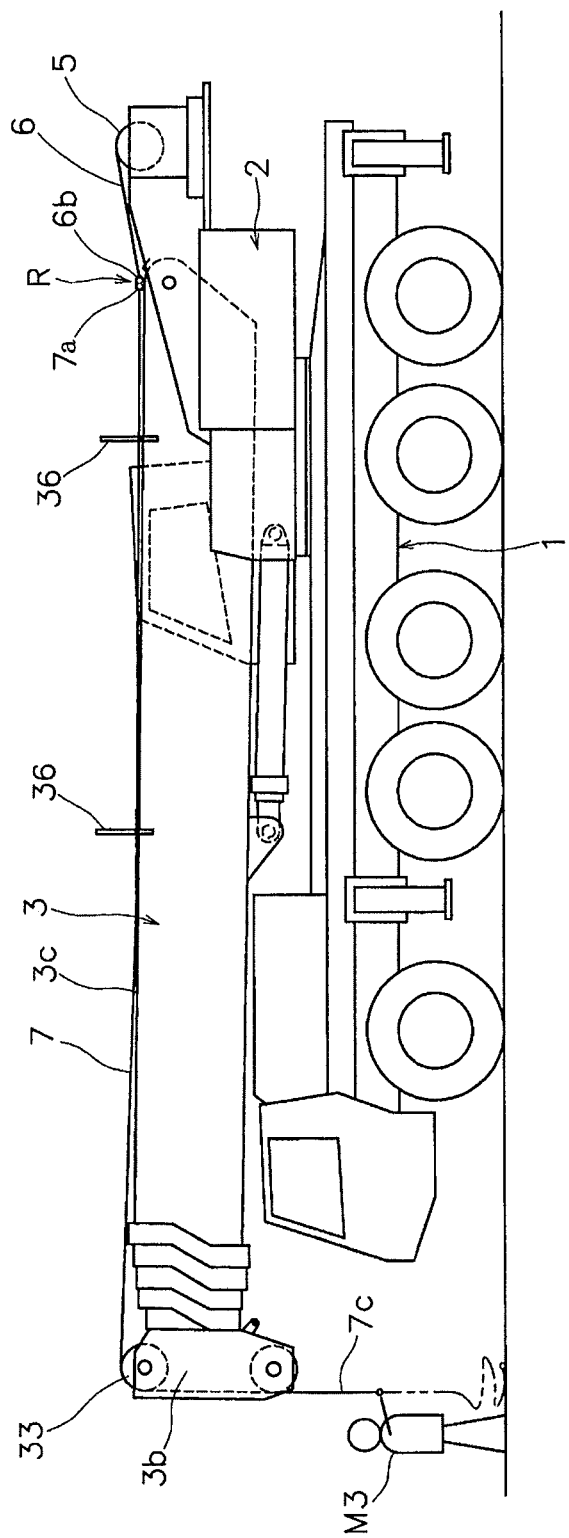
FIG. 18 is a drawing showing a state that has been changed from FIG. 17.
Figure 19:
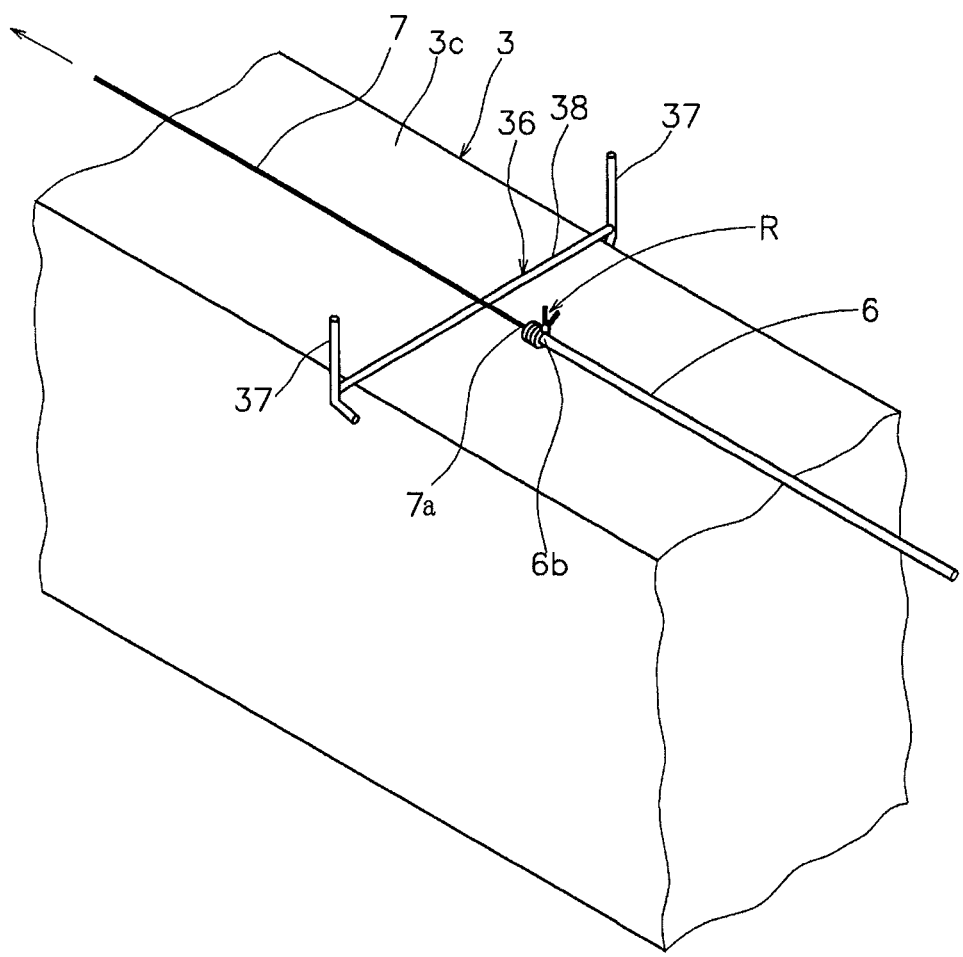
FIG. 19 is an enlarged perspective view showing when the connecting portion R shown in FIG. 18 is about to reach an obstacle on the upper surface of the boom.

Hereinafter, the rope connecting support according to the present embodiment will be described with reference to FIGS. 1 to 15. FIGS. 1 to 4 show a rope connecting support 4 according to Embodiment 1. FIGS. 5 and 6 show a state in which the rope connecting support 4 according to Embodiment 1 is stored. FIGS. 7 to 11 show a method of stretching a hoist rope on an upper surface 3c of a boom 3, by using the rope connecting support 4 according to Embodiment 1. FIGS. 12 to 14 show the rope connecting support 4 according to Embodiments 2 to 4, respectively. FIG. 15 is a vertical sectional view showing the rope connecting support 4 shown in FIG. 14 according to Embodiment 4. The rope connecting support 4 according to Embodiment 1 shown in FIGS. 1 to 4 corresponds to claims 1 to 4, and 6. Embodiment 2 shown in FIG. 12 and Embodiment 3 shown in FIG. 13 correspond to claims 1, 3, 4 and 6. The rope connecting support 4 according to Embodiment 4 shown in FIGS. 14 and 15 corresponds to claims 1 to 6.

The crane vehicle using the rope connecting support 4 according to each embodiment of the present invention is large, and therefore the upper surface 3c of the boom 3 has a height of about 4 m from the ground even if the boom 3 lies in horizontal position, as shown in FIGS. 7 to 11. Then, when such a large crane vehicle moves on a public road, its boom 3 and winch 5 (sub-winch) sometimes are removed and delivered separately due to a weight limit or height limit. In this case, a hoist rope 6, which will be stretched along the upper surface 3c of the boom 3, is wound around the winch.

Then, in order to make the crane operational in a workplace, it is necessary to draw the front end side of the hoist rope 6 wound around the winch 5 to the front end 3b of the boom 3 along the upper surface 3c of the boom 3. Here, the rope connecting support 4 according to each embodiment is used to draw the front end 6b side of the hoist rope 6 reeled out of the winch 5 to the front end 3b of the boom 3, along the upper surface 3c of the boom 3, by connecting the front end 6b of the hoist rope 6 to one end 7a of an auxiliary rope 7 on a swivel base 2 and drawing the other end 7c (FIG. 8) of the auxiliary rope 7 down from a position beneath the front end 3b of the boom 3, as described in detail later. Hereinafter, one end 7a of the auxiliary rope 7 may be referred to as "base end" 7a of the auxiliary rope 7, and the other end 7b of the auxiliary rope 7 may be referred to as "front end" 7b of the auxiliary rope 7."

Now, the crane vehicle shown in FIGS. 7 to 11 will be briefly described. This crane vehicle is equipped with the swivel base 2 on a vehicle 1, and the boom (telescopic boom) 3 and the winch 5 are mounted on the swivel base 2. Here, in FIGS. 7 to 11, the boom 3 is directed to the back of the vehicle 1.

The boom 3 is a telescopic boom consisting of a base boom 31, a top boom 32, and a plurality of intermediate booms placed between the base boom 31 and the top boom 32. A sheave 33 is mounted on the front end 3b of the top boom 32 (which is the front end 3b of the boom 3). This boom 3 is raised and lowered by a boom cylinder 30, and extended and retracted by a telescopic cylinder built in the boom 3.

As shown in FIGS. 5 and 6, the winch 5 accommodates a drum 52 in a winch box 51 to allow the hoist rope 6 wound around the drum 52 to be reeled in and out by a hydraulic motor.

As shown in FIGS. 1 to 4, and 6, a rod part 62 having an outer diameter greater than that of the rope part (wire) 61 is mounted to the front end 6b of the hoist rope 6 wound around the winch 5 (drum 52). Here, the hoist rope 6 (rope part 61) used for this sort of large crane vehicle is substantially thick, for example, 16 mm or more. With this embodiment, the thickness of the rope part 61 is about 18 mm, but is not limited to this value. When the thickness of the rope part 61 is about 18 mm, it is preferred that the thickness of the rod part 62 is about 32 mm, but is not limited to this value. In addition, it is preferred that the length of the rod part 62 is, for example, about 150 mm, but is not limited to this value. These dimensions may be changed accordingly.

With the method of stretching a hoist rope by using the rope connecting support 4 according to each embodiment, the auxiliary rope 7 is used to pull the front end side of hoist rope 6. This auxiliary rope 7 is made of a soft and thin string (for example, nylon rope). The base end 7a of the auxiliary rope 7 according to the embodiments other than Embodiment 2 shown in FIG. 12 is formed in a ring shape (ring part 71), and has hole 72 into which a pin 44 can be inserted. Here, with the embodiment shown in FIG. 12, a connector 73 which is U-shaped in planar view is mounted to the base end 7a of the auxiliary rope 7, and the pin 44 is inserted into both side plates of the connector 73.

Embodiment 1

FIGS. 1 to 4 show the rope connecting supports 4 according to Embodiment 1. The rope connecting support 4 includes: a hoist rope locking part 42 that removably locks the rod part 62 provided on the front end 6b of the hoist rope 6 onto the upper surface of a base 41 having a predetermined dimension in one end 41a side of the base 41; and an auxiliary rope connecting part 43 that can connect the base end 7a of the auxiliary rope 7 to the upper surface of the base 41 in the other end side of the base 41. Hereinafter, one end of the base 41 on which the hoist rope locking part 41 is formed may be referred to as "rear end" 41a of the base 41, and the other end of the base 41 in which the auxiliary rope connecting part 43 is formed may be referred to as "front end" 41b of the base 41.

The base 41 is a flat plate whose bottom surface has a predetermined dimension. The bottom surface of the flat base 41 (excluding an uphill part 45 described later) may have a dimension: a front-to-back length of about 200 mm; and a right-to-left width of about 110 mm, but is not limited to these values.

The above-described hoist rope locking part 42 includes: a standing portion 42a that stands up from the rear end 41a of the base 41; a bend portion 42b that is bent from the standing portion 42a to the front end 41b side of the base 41; and an inverted L-shaped cutout portion 42a that is formed across the standing portion 42a and the bend portion 42b.

The width of the cutout portion 42c of the hoist rope locking part 42 may be about 22 mm, for example, slightly greater than the thickness (about 18 mm) of the rope part 61 of the hoist rope 6, but be smaller than the thickness (about 32 mm) of the rod part 62 of the hoist rope 6. Therefore, the rope part 61 (small diameter part) of the hoist rope 6 can vertically pass through the cutout portion 42c of the hoist rope locking part 42, but the rod part 62 (large diameter part) of the hoist rope 6 cannot pass through the cutout portion 42c neither vertically nor backward.

Figure 1:
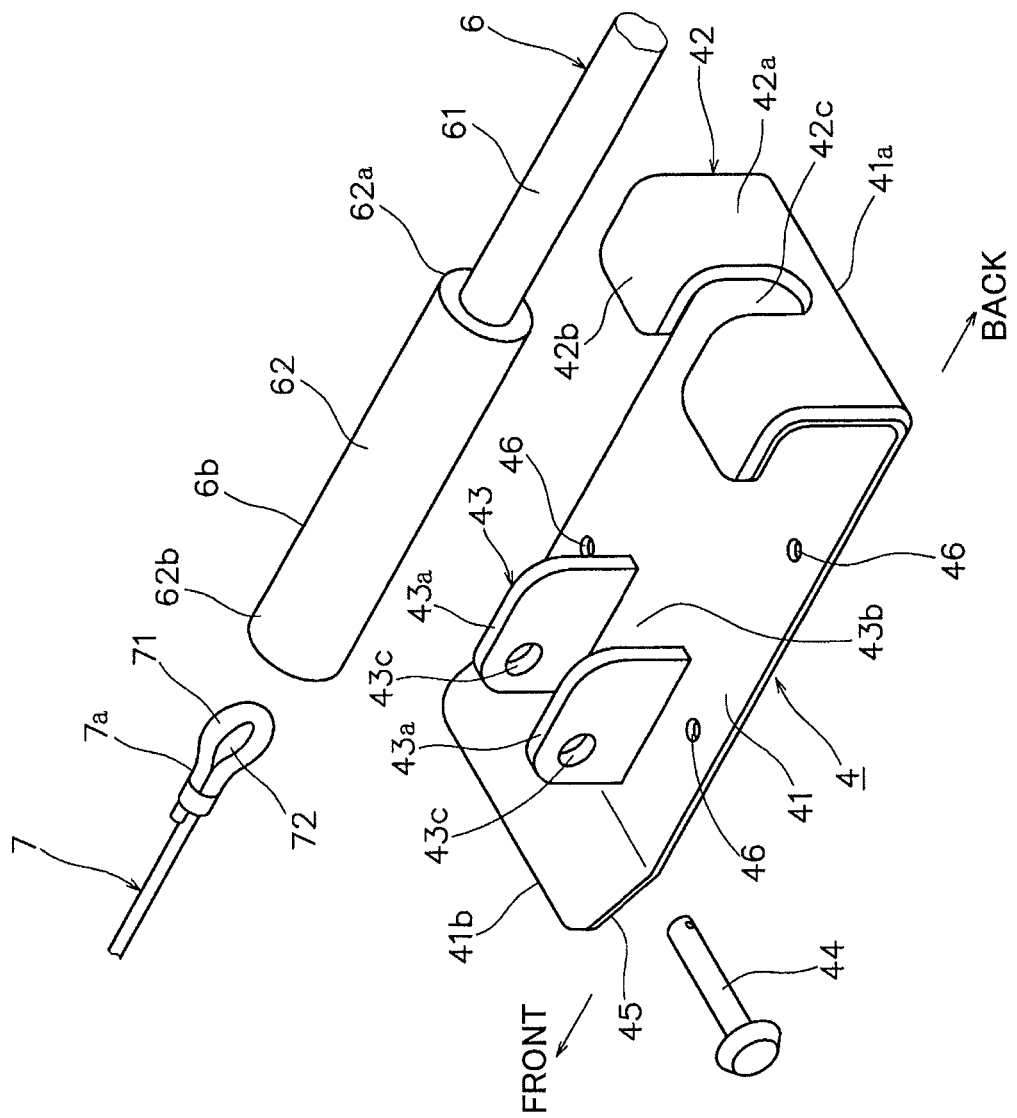
FIG. 1 is a perspective view showing a rope connecting support and its associated components which are separated therefrom, according to Embodiment 1 of the present invention.
Figure 2:
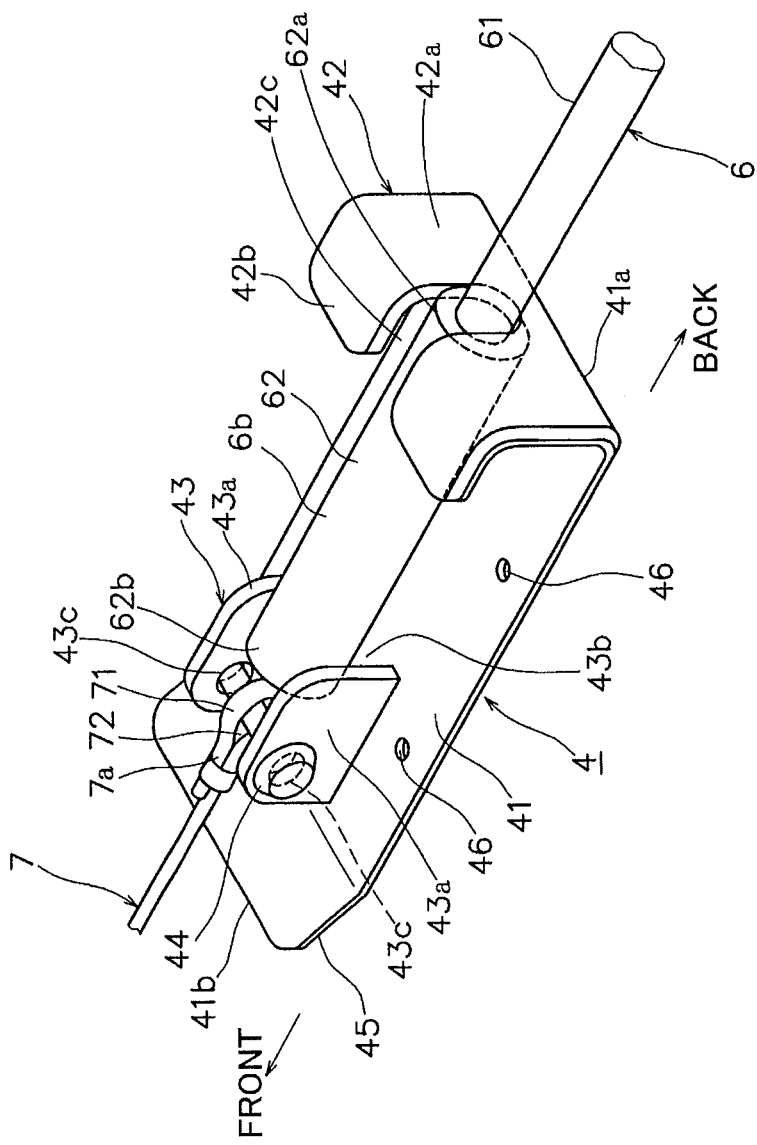
FIG. 2 is a perspective view showing a state in which the rope connecting support and its associated components shown in FIG. 1 are coupled to each other.

In order to lock the front end 6b of the hoist rope 6 onto the hoist rope locking part 42, as shown in FIG. 1, while the rear end 62a of the rod part 62 provided on the front end 6b' of the hoist rope 6 is located ahead of the front end of the bend portion 42b of the hoist rope locking part 42, the rope part 61 is dropped into the cutout portion 42c from above, and then the rope connecting support 4 moves forward with respect to the front end 6b of the hoist rope 6. Therefore, as shown in FIGS. 2 to 4, the rear end 62a of the rod part 62 abuts on both side edges of the cutout portion 42c formed in the standing portion 42a, while part of the rod part 62 near the rear end 62a is covered by the bend portion 42b (including both side edges of the cutout portion 42c). That is, as shown in FIGS. 2 to 4, when the front end 6b of the hoist rope 6 is locked onto the hoist rope locking part 42, the rod part 62 provided on the front end 6b of the hoist rope 6 cannot get out backward and upward from the rope connecting support (corresponding to claims 3).

The auxiliary rope connecting part 43 includes two, right and left upright plates 43a configured to sandwich and pin the base end 7a (ring part 71) of the auxiliary rope 7 therebetween. These upright plates 43a includes pin holes 43c into which a pin 44 is inserted, respectively. In addition, the width of the gap (interval) between the upright plates 43a is slightly greater than the outer diameter (for example, about 32 mm) of the rod part 62 provided on the front end 6b of the hoist rope 6.

Then, in the state in which the base end 7a of the auxiliary rope 7 is sandwiched between the upright plates 43a and fixed by the pin 44, and the rod part 62 provided on the front end 6b of the hoist rope 6 is locked onto the hoist rope locking part 42, the rod part 62 is positioned on the right and left sides thereof by the upright plates 43a, and also positioned with respect to the longitudinal direction of the rod part 62 by the standing portion 42a and the base end 7a of the auxiliary rope 7 which is pinned (corresponding to claims 1 and 2).

Therefore, when the rope connecting support 4 connects between the front end 6b of the hoist rope 6 and the base end 7a of the auxiliary rope 7, it is possible to prevent the rod part 62 provided on the front end 6b of the hoist rope 6 from shifting forward and backward, right and left, and upward and downward, as shown in FIGS. 2 to 4. Here, in order to remove the front end 6b (rod part 62) of the hoist rope 6 from the hoist rope locking part 42 while the ropes 6 and 7 are connected to one another as shown in FIGS. 2 to 4, the rod part 62 in the front end 62b side inclining upward is shifted forward with respect to the rope connecting support 4 (or the rope connecting support 4 is shifted backward with respect to the rod part 62), and therefore the rear end 62a of the rod part 62 is located ahead of the front end of the bend portion 42b of the hoist rope locking part 42, so that it is possible to remove the rope part 61 upward from the cutout portion 42c of the hoist rope locking part 42.

In addition, the rope connecting support 4 includes an uphill part 45 which is formed by upwardly inclining the lower surface of the front end 41b side of the base 41 in which the auxiliary rope connecting part 43 is provided. This uphill part 45 is inclined at about 25 to 30 degrees with respect to the flat surface of the base 41, and is formed such that the front end 41b of the base 41 is, for example, about 15 mm higher than the flat bottom surface of the base 41. The rope connecting support 4 is moved to the front end 3b of the boom 3 on the upper surface 3c of the boom 3 while the ends (6b and 7a) of the ropes 6 and 7 are connected to one another. Here, the uphill part 45 becomes the head of the rope connecting support 4 when being moved to the front end 3b of the boom 3.

Locking means 46 are formed on the base 41 of the rope connecting support 4 to removably lock the rope connecting support 4 on the winch box 51 (see FIGS. 5 and 6) (corresponding to claim 6). With this embodiment, as the locking means, bolt insertion holes 46 (three holes in the drawings) are formed on the base 41. Then, as shown in FIGS. 5 and 6, bolts 47 to be inserted into the bolt insertion holes 46 are fixed (welded) to the inner surface (wall 51a) of the winch box 51 in advance, and the bolts 47 fixed to the back wall 51b of the winch box 51 are fitted into the bolt insertion holes 46 while the front end 6b (rod part 62) of the hoist rope 6 is locked onto the hoist rope locking part 42 of the rope connecting support 4, and then are fastened by nuts. In this case, butterfly nuts are convenient, which allow the bolts to be tightened and loosened without a tool (by hand). However, another configuration is possible where three bolt insertion holes, which correspond to the bolt insertion holes 46 of the base 41, are formed on the back wall 51a of the winch box 51, and then the base 41 is removably fixed to the inner surface of the back wall 51a of the winch box 51 by using the bolts 47 and the nuts. Further another configuration is possible where the bolt insertion holes 46 of the base 41 are external threads (or nuts welded to the upper surface of the base 41 at the positions to surround the bolt insertion holes 46). Here, the bolts 47 are screwed into the external threads (or nuts) from the outer surface of the back wall 51a of the winch box 51 via the bolt insertion holes 46 formed on the back wall 51a of the winch box 51.

The location onto which the rope connecting support 4 is locked by using the locking means (bolt insertion holes) is not limited to the winch box 51 as long as the location is in the vicinity of the winch 5. Here, the locking means 46 may be pieces such as hooks instead of the bolt insertion holes.

Next, with reference to FIGS. 7 to 11, a method of stretching a hoist rope by using the rope connecting support 4 according to Embodiment 1 will be described.

In a state in which the hoist rope 6 is wound around the winch 5 (drum 52), the base 41 of the rope connecting support 4 is fixed (bolted) to the inner surface of the back wall 51a of the winch box 51 by using the locking means (bolt insertion holes) 46 while the front end 6b (rod part 62) of the hoist rope 6 is held by the hoist rope locking part 42 of the rope connecting support 4, as shown in FIGS. 5 and 6.

Figure 7:
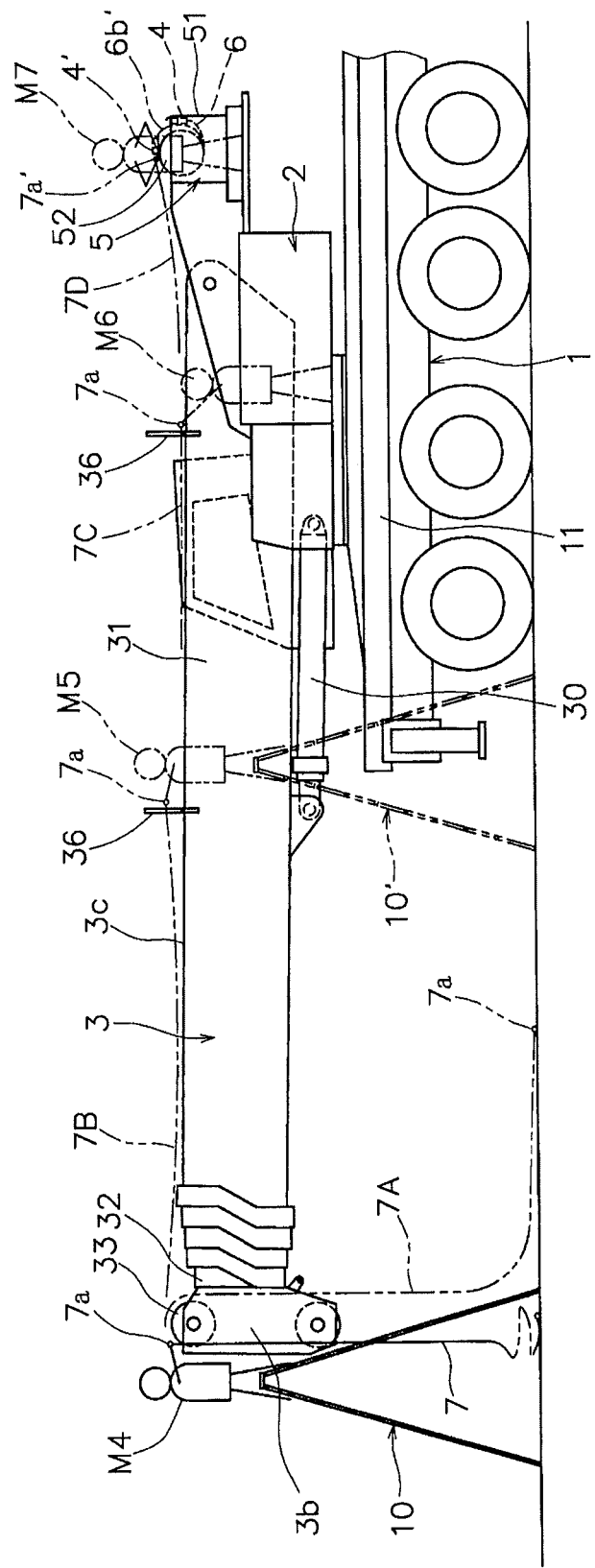
FIG. 7 is a drawing explaining a method of stretching an auxiliary rope on the upper surface of the boom, by using the rope connecting support shown in FIG. 1.

Then, according to the method of stretching a hoist rope shown in FIG. 7, the front end 6b' of the hoist rope 6 which is reeled out of the winch drum 52 is connected to the base end 7a' of the auxiliary rope 7D on the swivel base 2. Here, the auxiliary rope 7 (7B, 7C, and 7D) is laid along the upper surface 3c of the boom 3 from the front end 3b side of the boom 3 in advance.

According to the method of stretching an auxiliary rope shown in FIG. 7, first a stepladder 10 is provided near the front end 3b of the boom 3; an operator M4 rides on the stepladder 10, holding the front end of the auxiliary rope 7; and the base end 7a side of the auxiliary rope 7 is brought down to the ground as shown as 7A while the front end side of the auxiliary rope 7 is hung on the sheave 33 provided on the front end 3b of the boom 3. Here, it is safe for the operator M4 to work on the stepladder 10 because the operator M4 works at the fixed position of the stepladder 10 which is lower than the upper surface 3c of the boom 3.

Figure 9:
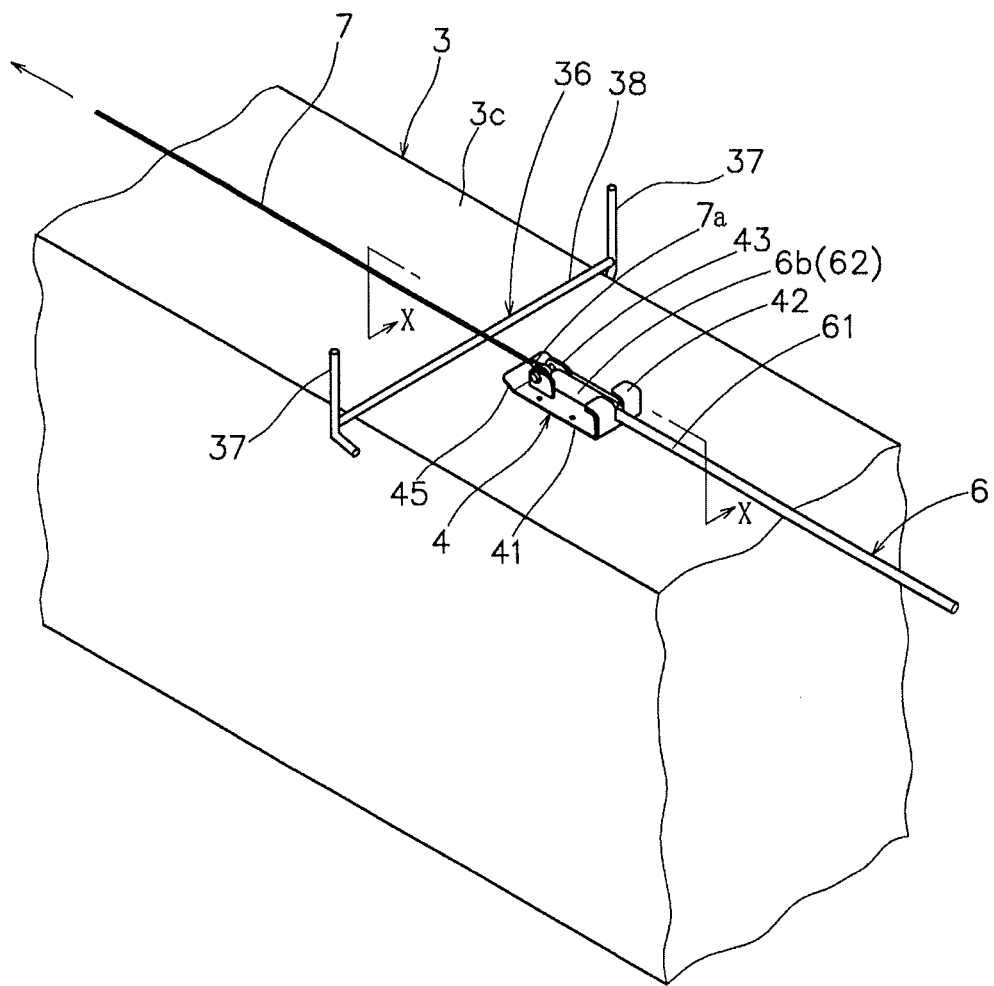
FIG. 9 is an enlarged perspective view showing when the rope connecting support shown in FIG. 8 is about to reach an obstacle on the upper surface of the boom.

Next, the operator M4 gets down from the stepladder 10 and moves the stepladder 10 to a position (stepladder 10') near the guard member 36 on the upper surface 3c of the boom 3; the operator M5 rides on the stepladder 10', holding the base end 7a of the auxiliary rope 7A; and then, the operator M5 lays the auxiliary rope 7B along the upper surface 3c of the boom 3 and passes the base end 7a of the auxiliary rope 7B through the first guard member 36 (between the upright rods 37 shown in FIG. 9).

Next, the operator walks on the vehicle body 11 (and the swing bearing part), holding the base end 7a of the auxiliary rope 7B, and draws the auxiliary rope to the second guard member 36 as the auxiliary rope 7C (the position of the operator M6); and then, walks on the swivel base 2 and passes the auxiliary rope throughout the entire length from the front end 3b of the boom 3 to the swivel base 2 as the auxiliary rope 7D. Here, in this case, the front end 7c (shown in FIG. 8) of the auxiliary rope 7D remains to hang down from the front end 3b of the boom 3 by a predetermined length.

Next, after laying the auxiliary rope 7D along the upper surface 3c of the boom 3, the operator rides on the swivel base 2 as the operator M7; removes the rope connecting support 4 with front end of the hoist rope, from the winch box 51; and locks the ring part 71 of the base end 7a of the auxiliary rope 7 onto the auxiliary rope connecting part 43 (FIGS. 1 to 4) of the rope connecting support 4' by using the pin 44; so that the rope connecting support 4' can connect the base end 6a' of the hoist rope 6 to the base end 7a' of the auxiliary rope 7 on the swivel base 2, as shown in FIG. 7.

As described above, the entire processes of the work shown in FIG. 7, which include the stretching of the auxiliary rope 7 on the upper surface 3c of the boom 3 and the connection between the base end 7a' of the auxiliary rope 7 and the rope connecting support 4', can be performed on lower and more stable places such as the stepladder 10, the vehicle body 11 and the swivel base 2 than the upper surface 3c of the boom 3, and therefore the safety for the operator is assured.

Here, with the present embodiment, a configuration has been described where after the auxiliary rope 7 is laid along the upper surface 3c of the boom 3 from the front end 3b of the boom 3 and stretched to the swivel base 2, the base end 7a of the auxiliary rope 7 is locked onto the auxiliary rope connecting part 43 of the rope connecting support 4. However, another configuration is possible where the base end 7a of the auxiliary rope 7 is first locked onto the auxiliary rope connecting part 43 of the rope connecting support 4 on the swivel base 2, and then, the front end side of the auxiliary rope 7 is guided to the front end 3b of the boom 3 while the auxiliary rope 7 is laid along the upper surface 3c of the boom 3 in the reverse order (M6→M5→M4).

Figure 8:
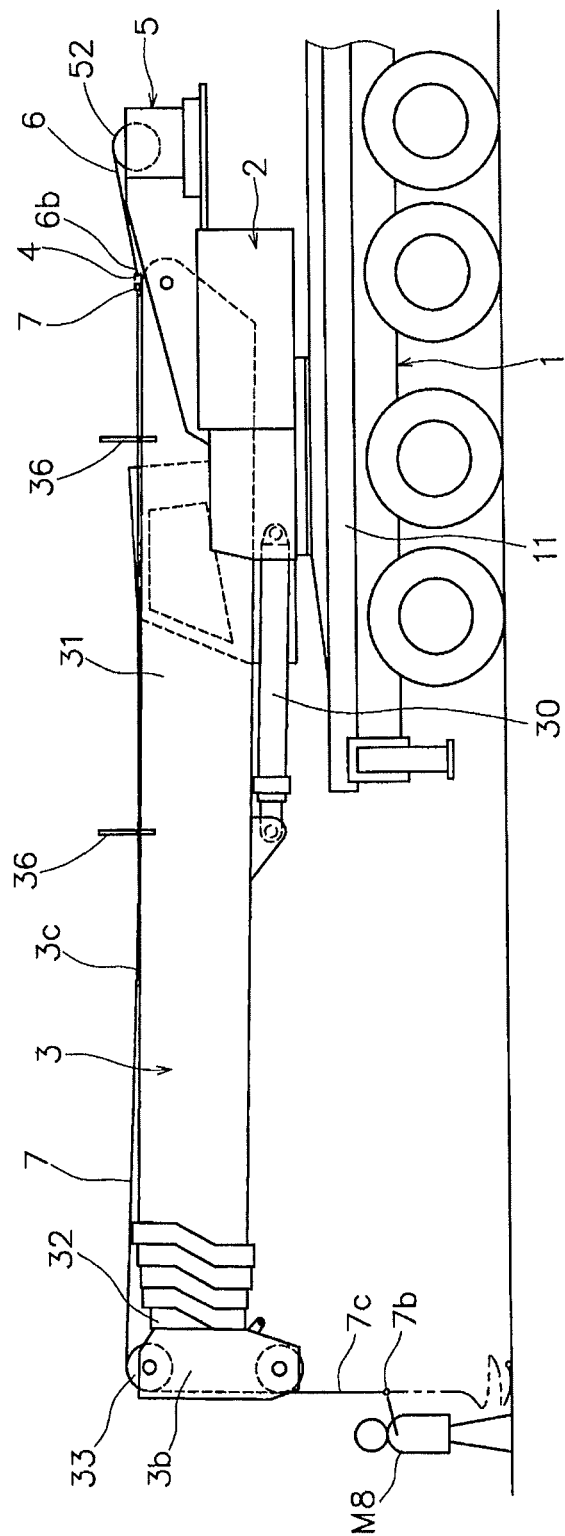
FIG. 8 is a drawing showing a state that has been changed from FIG. 7.

Then, as shown in FIG. 8, when the operator M8 on the ground draws down the front end 7c of the auxiliary rope 7 hanging below the front end 3b of the boom 3 while the rope connecting support 4 connects between the front end 6b of the hoist rope 6 and the base end 7a of the auxiliary rope 7 on the swivel base 2 (above the base end of the boom), the rope connecting support 4 connecting between the ends of the ropes 6 and 7 is moved to the front end 3b of the boom 3 on the upper surface 3c of the boom 3 while the lower surface of the base 41 faces the upper surface 3c of the boom 3. In this case, the rope connecting support 4 is moved such that the uphill part 45 of the rope connecting support 4 faces the direction of the movement.

In addition, the base 41 of the rope connecting support 4 is a flat rectangular plate having a predetermined dimension, and therefore provides a wide contact area between the lower surface of the base 41 and the upper surface 3c of the boom 3. As a result, it is possible to move the rope connecting support 4 in a stable posture without sway.

Figure 10:
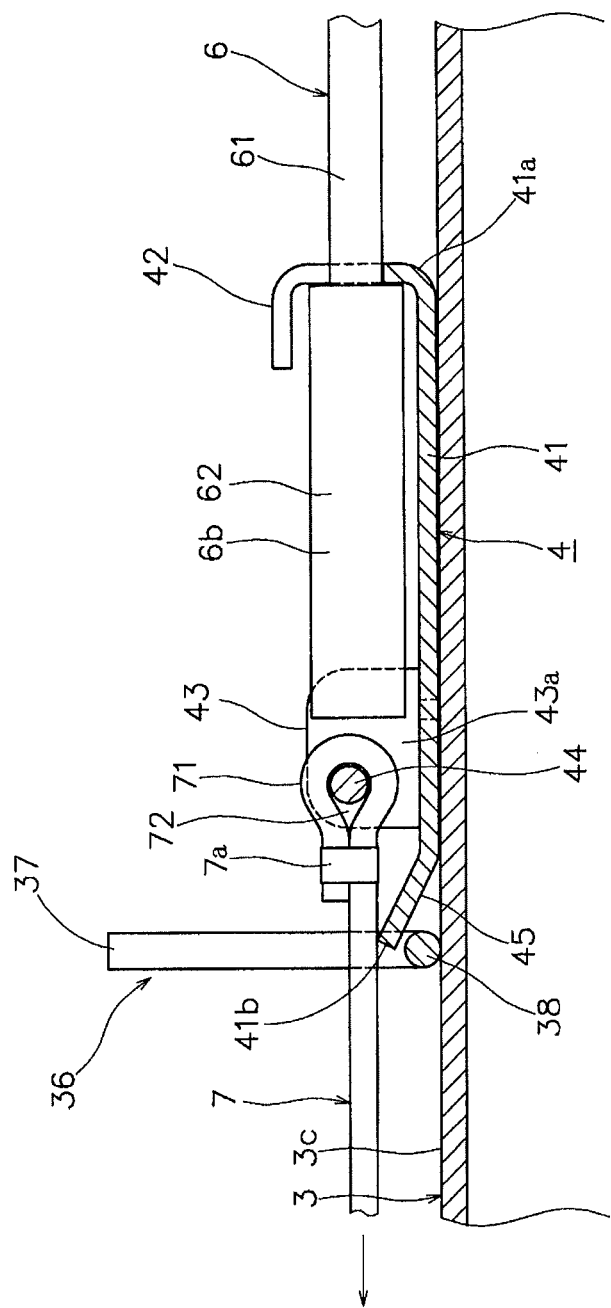
FIG. 10 is an enlarged cross-sectional view of FIG. 9 taken along line X-X.

Incidentally, as shown in FIGS. 9 and 10, the connecting bar 38 of the guard member 36 is provided on the upper surface 3c of the boom 3, which is an obstacle when the rope connecting support 4 is moved. However, when the rope connecting support 4 reaches the obstacle (connecting rod 38), the uphill part 45 can easily run on the obstacle (connecting bar 38), and therefore the rope connecting support 4 can smoothly get over the obstacle.

Figure 11:
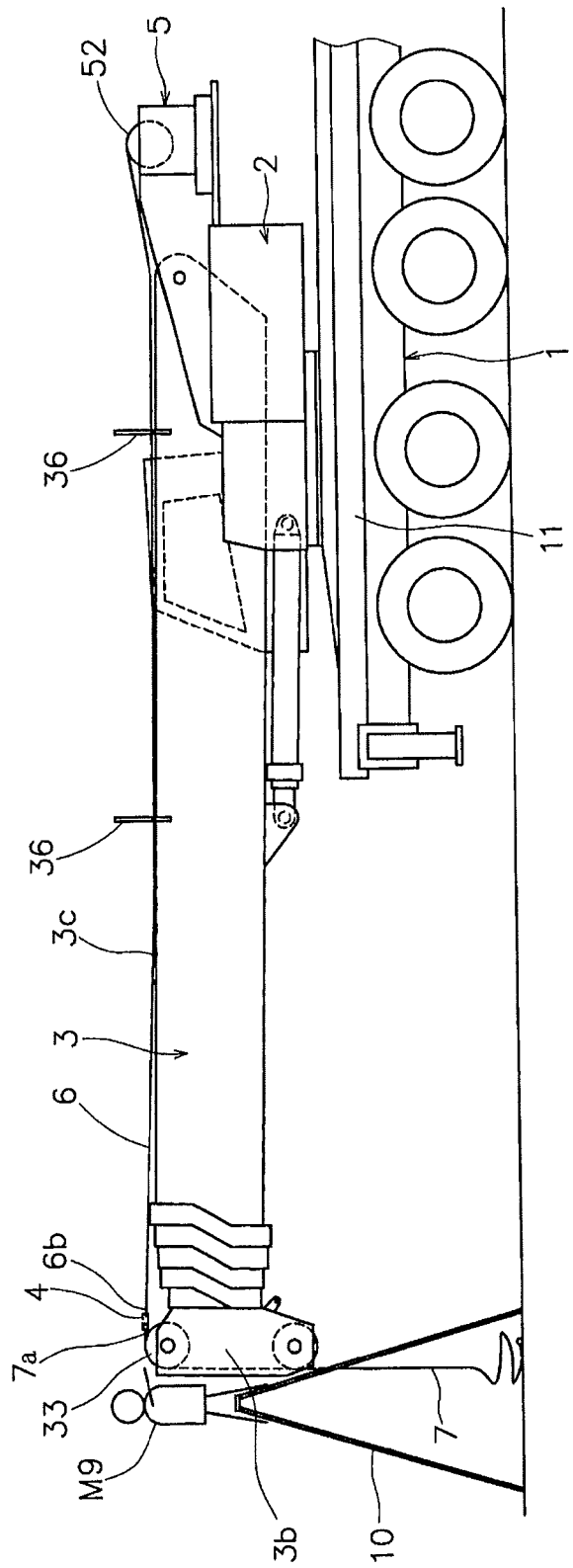
FIG. 11 is a drawing explaining the final step of the method of stretching a hoist rope by using the rope connecting support according to Embodiment 1 of the present invention.

Then, as shown in FIG. 11, at the time the rope connecting support 4 reaches the front end 3b (sheave 33) of the boom 3, the auxiliary rope 7 is stopped from being drawn down. Here, in order to check that the rope connecting support 4 has reached the sheave 33 on the front end 3b of the boom 3 from the ground, a marking is made on a position near the base end of the auxiliary rope 7 as the indication of the position at which the auxiliary rope 7 is stopped being drawn, and therefore it is possible for the operator to see the marking from the ground to check the end of the drawing.

After that, the operator sets up the stepladder 10 in the vicinity of the front end 3b of the boom 3 and rides on the stepladder 10; removes the front end 6b (rod part 62) of the hoist rope 6 from the hoist rope locking part 42 (FIGS. 9 and 10) of the rope connecting support 4; and draws the removed front end 6a of the hoist rope 6 downward via the sheave 33 on the front end 3b of the boom 3; and therefore, it is possible to stretch the hoist rope 6 to the front end 3b of the boom 3 along the upper surface 3b of the boom 3.

Embodiment 2

FIG. 12 shows a variation of the auxiliary rope connecting part 43 of the rope connecting support 4 according to Embodiment 1 (shown in FIGS. 1 to 4). That is, the rope connecting support 4 according to Embodiment 2 shown in FIG. 12 employs one upright plate 43a as the auxiliary rope connecting part 43 while a connector 73 which is U-shaped in planar view is mounted to the base end 7a of the auxiliary rope 7. Pin holes are formed on the upright plate 43a and both side plates of the connector 73, respectively.

Then, in order to connect the base end 7a of the auxiliary rope 7 to the auxiliary rope connecting part 43, the upright plate 43a is sandwiched between the two side plates of the connector 73 mounted to the base end 7a of the auxiliary rope 7, and the pin 44 is inserted into the side plates of the connector 73 and the upright plate 43a.

Here, the rope connecting support 4 according to Embodiment 2 shown in FIG. 12 does not include the features of claims 2 and 5, but includes the features of claims 1, 3, 4 and 6.

Embodiment 3

FIG. 13 shows the rope connecting support according to Embodiment 3, which is a variation of FIG. 12. The auxiliary rope connecting part 43 is formed as a single upright plate 43a. Here, the base end 7a (ring part 71) of the auxiliary rope 7 is locked onto the side surface of the upright plate 43a by using a bolt 44a equivalent to the pin 44. That is, the bolt 44a projecting in the horizontal direction is provided on the upright plate 43a, which may be fixed or removably attached, in advance; the front end of the bolt 44a is fitted into the hole 72 of the ring part 71 as the base end 7a of the auxiliary rope 7; the nut (butterfly nut) 44b is screwed into the front end of the bolt 44a; and therefore the nut 44b can prevent the base end 7a of the auxiliary rope 7 from dropping out of the ring part 71.

Here, the rope connecting support 4 according to Embodiment 3 shown in FIG. 13 does not include the features of claims 2 and 5 but includes the features of claims 1, 3, 4, and 6.

Embodiment 4

FIGS. 14 and 15 show the rope connecting support 4 according to Embodiment 4, which is a variation of the rope connecting support 4 according to Embodiment 1 shown in FIGS. 1 to 4 by adding the feature of claim 5.

That is, the auxiliary rope connecting part 43 of the rope connecting support 4 according to Embodiment 4 includes two, right and left upright plates 43a at a distance therebetween wider than the diameter of the rod part 62. Pin holes 43d into which pins as stoppers 48 (hereinafter referred to as "stopper pins") are inserted are formed on the upright plates 43a, respectively, in addition to the pin holes 43c to pin the base end 7a (ring part 71) of the auxiliary rope 7. The respective pin holes 43d for the stopper pin 48 are formed at a level higher than the upper surface of the front end 62b of the rod part 62 while the front end 62b of the rod part 62 provided on the front end 6b of the hoist rope 6 locked onto the hoist rope locking part 42 is sandwiched between the upright plates 43a.

Each of the pin holes 43d are designed for the stopper pin 48 to allow the stopper pin 48 to be removably inserted into the pin holes 43d. Then, in a state in which the stopper pins 48 are removed (in which the rod part is open upwardly as recited in claim 5), the front end 62b of the rod part 62 locked onto the hoist rope locking part 42 is open upwardly. Meanwhile, in a state in which the stopper pin 48 is inserted (in which the rod part is closed upwardly as recited in claim 5), the front end 62b of the rod part 62 is closed upwardly by the stopper pin 48 as shown in FIG. 15. Here, when the front end 62b of the rod part 62 is open upwardly, it is possible to raise the front end 62b side of the rod part 62 (that is, it is possible to remove the rod part 62 from the hoist rope locking part 42). Meanwhile, when the front end 62b of the rod part 62 is closed upwardly by the stopper pin 48, it is not possible to raise the front end 62b side of the rod part 62, and therefore the rod part 62 remains to be locked.

With Embodiment 4, the stopper pin 48 is integrated with a locking pin 44 used to lock the base end 7a of the auxiliary rope 7. Then, at the same time the locking pin 44 is inserted into or removed from the pin holes 43c, the stopper pin 48 can be inserted into or removed from the pin holes 43d.

Here, with this Embodiment 4, a pin that can be inserted into or removed from the pin holes 43d, which is independent of the locking pin 44, can be employed as the stopper 48. However, it is by no means limiting, but another configuration is possible instead of a pin, as long as it can be provided switchably between a position in which the rod part is closed upwardly and a position in which the rod part is open upwardly.

The rope connecting support 4 according to each of Embodiments 1 to 4 can produce the following effects.

First, the base 41 includes the uphill part 45 which is formed by upwardly inclining the lower surface of the front end 41b side of the base 41 in which the auxiliary rope connecting part 43 is provided. Therefore, when the rope connecting support 4 is moved on the upper surface 3c of the boom 3 while the rope connecting support 4 connects between the respective ends of the hoist rope 6 and the auxiliary rope 7, the uphill part 45 allows the rope connecting support 4 to easily get over the obstacles (connecting rods 38 of the guard members 36) on the upper surface 3c of the boom 3. As a result, it is possible to smoothly draw out the hoist rope 6.

In addition, in the state in which the base end 7a of the auxiliary rope 7 is pinned to the auxiliary rope connecting part 43, and the rod part 62 provided on the front end 6b of the hoist rope 6 is locked onto the hoist rope locking part 42, the rod part 62 is positioned on the right and left sides thereof and fixed not to move in the longitudinal direction of the rod part 62. As a result, it is possible to stably hold the front end 6b of the hoist rope 6 in position with respect to the rope connecting support 4 (to prevent the front end 6b of the hoist rope 6 from being removed accidentally from the rope connecting support 4).

Moreover, the features of claims 2 to 6 can produce the effects described in the above-described "Effect of the invention."

The invention claimed is:

1. A rope connecting support for use in a crane vehicle for stretching a hoist rope, the rope connecting support is used to draw a front end side of the hoist rope to a front end of a boom along an upper surface of the boom by connecting the front end of the hoist rope wound around a winch on a swivel base of the crane vehicle to one end of an auxiliary rope used for pulling the hoist rope and drawing the other end of the auxiliary rope down via the front end of the boom, the rope connecting support comprising:
    a base having a predetermined width;
    a hoist rope locking part configured to removably lock a rod part provided on the front end of the hoist rope onto an upper surface of the base in one end side of the base; and an auxiliary rope connecting part configured to removably connect one end of an auxiliary rope to the upper surface of the base in an other side of the base, wherein:

the base includes an uphill part formed by upwardly inclining a lower surface of the other end side of the base in which the auxiliary rope connecting part is provided;

the auxiliary rope connecting part includes an upright plate to which the one end of the auxiliary rope is pinned; and one end of the hoist rope locked onto the hoist rope locking part is positioned on right and left sides, and also positioned with respect to a longitudinal direction of the rod part by the one end of the auxiliary rope that is pinned to the upright plate.

2. The rope connecting support according to claim 1, wherein:
   the auxiliary rope connecting part includes two, right and left upright plates configured to be able to sandwich and fix the one end of the auxiliary rope therebetween by using a pin; and
   a front end of the rod part is positioned between the upright plates while the rod part is locked onto the hoist rope locking part.

3. The rope connecting support according to claim 2, wherein a stopper is provided on the upright plates of the auxiliary rope connecting part to prevent the front end side of the rod part from being lifted up while the rod part is locked onto the hoist rope locking part, the stopper being provided switchably between a position in which the rod part is closed upwardly and a position in which the rod part is open upwardly.

4. The rope connecting support according to claim 1, the hoist rope locking part including:
   a standing portion configured to prevent a rear end of the rod part from getting out backward; and
   a bend portion configured to bend to a front end side of the base to prevent the rear end of the rod part from getting out upward.

5. The rope connecting support according to claim 1, wherein the base includes a rectangular flat plate whose bottom surface has a predetermined dimension.

6. The rope connecting support according to claim 1, wherein the base includes a locking part configured to removably lock the rope connecting support onto a winch box or onto a position in a vicinity of the winch.

* * * * *